May 25, 1965  H. MERKEL  3,185,357
DISPENSING DEVICE FOR GRANULAR OR PULVERULENT MATERIALS
Filed Oct. 29, 1963  2 Sheets-Sheet 1

INVENTOR.
Hans Merkel
BY
Sparrow and Sparrow
ATTORNEYS

May 25, 1965 H. MERKEL 3,185,357
DISPENSING DEVICE FOR GRANULAR OR PULVERULENT MATERIALS
Filed Oct. 29, 1963 2 Sheets-Sheet 2
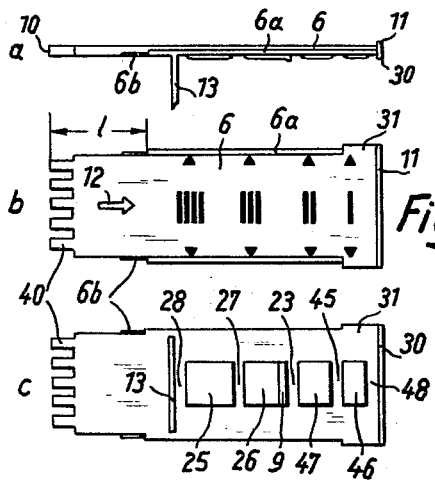
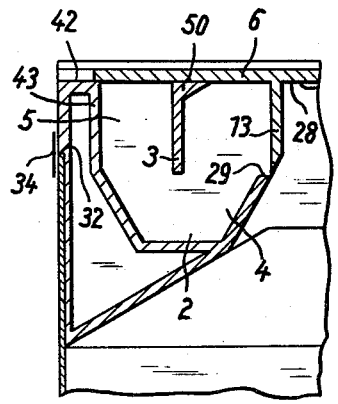
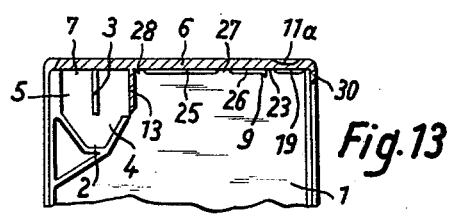
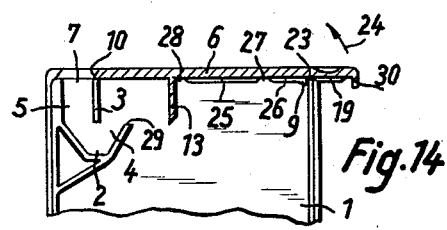
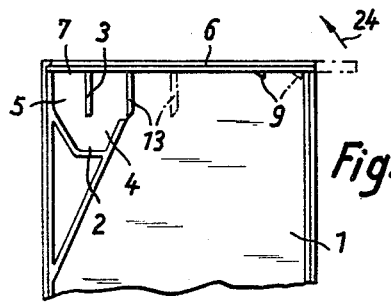
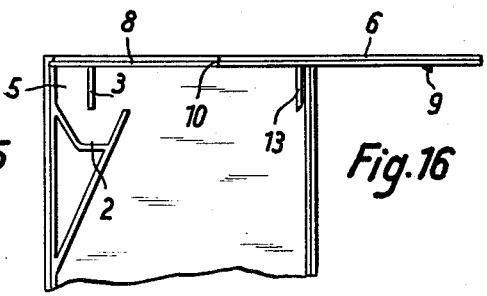
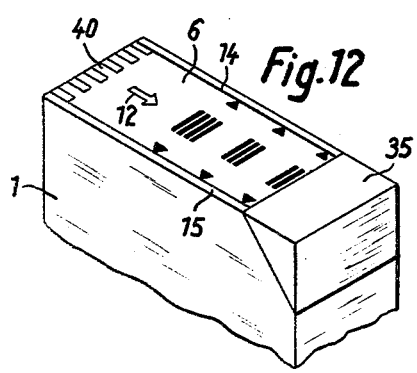
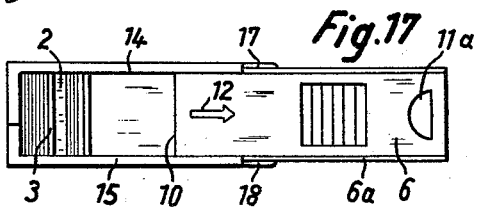
INVENTOR.
Hans Merkel
BY
Sparrow and Sparrow
ATTORNEYS

United States Patent Office 3,185,357
Patented May 25, 1965

3,185,357
DISPENSING DEVICE FOR GRANULAR OR
PULVERULENT MATERIALS
Hans Merkel, 5 and 5A Ruthmanninstrasse, Nurtingen,
Wurttemberg, Germany
Filed Oct. 29, 1963, Ser. No. 319,855
Claims priority, application Germany, Nov. 27, 1962,
M 54,853; May 28, 1963, M 56,989; Aug.
8, 1963, M 57,765
9 Claims. (Cl. 222—425)

The present invention relates to improvements in a dispensing device for dispensing measured amounts of a granular or pulverulent material from a container, as disclosed in my previous United States Patent No. 3,016,170, issued on January 9, 1962, which device comprises a container with an open upper side and provided with a storage compartment, a measuring compartment provided at the inside of the container near the open side thereof and partly divided by a partition into a receiving chamber and a dispensing chamber, the receiving chamber having an opening leading into the storage compartment, and the dispensing chamber having an outlet opening, a slidable cover for closing the open side of the container and having a stop member on its inner side permitting the cover to be opened only to a dispensing position in which it uncovers the outlet opening of the dispensing chamber, and a closure member secured to and projecting downwardly from the inner side of the cover and adapted to close the opening between the receiving chamber and the storage compartment when the cover is moved to its closed position, and to uncover this opening when the cover is opened to the dispensing position.

The limitation of the opening movement of the slide cover of the above-mentioned device to the dispensing position has the advantage that this position will always be accurately reached when the cover is drawn outwardly. It means, however, also that it is impossible to open the slide cover to any extent beyond the dispensing position. Consequently, it is practically impossible to refill the container which, when once empty, cannot be used again but can only be thrown away.

It is one of the objects of my present invention to overcome this disadvantage of my previous dispensing device. This is attained according to the invention in a very simple manner by shortening the grooved guide portions for the slide cover on the container walls so that they will extend only to points near the position in which the stop member on the slide cover is located when the latter is in the dispensing position, and by making the slide cover of a resilient construction so as to permit its unguided end portion to be resiliently bent upwardly for a distance equal to the height of the stop member. The stop member which limits the opening movement of the slide cover to the dispensing position may in this manner be rendered inoperative and the cover may be drawn outwardly beyond the dispensing position until the closure member on its inner side abuts against the side wall of the container. When the slide cover is in this position, its closing edge is located at a point far beyond the measuring compartment and the cover is thus opened far enough to permit the container to be easily refilled. In order to be used as a refill container, the container itself as well as the dispensing device therein are preferably made of a longer lasting construction. Such a more expensive construction of a refill container and its dispensing device will in the long run be cheaper than the construction of one to be thrown away after use since it may be frequently refilled from inexpensive packages.

Although the guides for the slide cover which may be shortened are preferably those which are formed by the grooved portions on the container, it is instead also possible to shorten the corresponding guide edges on the slide cover near the free end thereof.

Another feature of the invention consists in providing a projection or reinforcement on the inner side of the slide cover at a short distance from the stop member which in the dispensing position of the cover engages with the inner side of the side wall of the container. One side of this reinforcement then engages with the outer side of this container wall and thus forms a second stop member so that in the dispensing position the cover will be locked in both directions. The other side of this reinforcement also forms a stop member which engages with the same container wall when the cover is closed and thus locks the cover in this closed position and prevents it from sliding accidentally to its dispensing position.

A further locking projection may be provided on the inner side of the slide cover between the stop member for the dispensing position and the closure member for the purpose of arresting the slide cover in a position in which the material may be freely poured from the container independently of the measuring device.

The dispensing device according to the present invention may be further designed so as to permit the material to be sprinkled from the container. For this purpose, the slide cover is provided with narrow recesses or holes in or directly adjacent to its closing edge. When the cover is in its closed position, these holes or recesses are located above and are covered by an enlarged upper edge surface of the other side wall of the container adjacent to the outlet opening of the measuring compartment, while when the cover is drawn back very slightly to a position in which the closing edge thereof still covers the outlet opening of the measuring compartment, these holes or recesses in or near the closing edge will communicate with the dispensing chamber of the measuring compartment and form sprinkling openings. For holding the slide cover in the sprinkling position, its inner side is provided with another stop member at a short distance from the stop member for the normal dispensing position.

Further important advantages of the invention are attained by the combination of the features of extending the grooved guide portions on the front and rear container walls for guiding the slide cover only to points spaced from the side wall of the container against which the stop member or members and finally also the closure member on the slide cover may engage so as to permit the cover to be resiliently bent upwardly to disengage these stop members from the side wall, and of also extending the lateral guide edges on the slide cover which run in these grooved guide portions only to points spaced from the closing edge of the cover, and making the guideless parts on the container and on the slide cover of such lengths that, when the slide cover is drawn out until the closure member thereon engages with the mentioned side wall of the container, the cover will no longer be held by the remaining guiding means and may be lifted out of the container.

The advantages which are attained by the possibility of removing the slide cover from the container and of reinserting it therein are considerable. The container is preferably assembled of two box portions which may be simply made of plastic by injection molding, but the slide cover is then not inserted into the grooved guide portions. The coverless container may then be easily filled in a packing machine of a conventional type. For refilling the container, the consumer may remove the slide cover in the manner as above described and will thereby attain a much larger filling opening than he would attain by drawing out the cover up to the engagement of the closure member against the side wall of the container. The slide cover may also be easily replaced by another, for example, by one with larger or smaller sprinkling openings in accordance with the particular material to be packed in the container.

The aforementioned features and advantages of the present invention will become more clearly apparent from the following detailed description thereof which is to be read with reference to the accompanying drawings, in which—

FIGURE 10a shows a side view of the slide cover by itself;

FIGURE 10b shows a top view of FIGURE 10a;

FIGURE 10c shows a bottom view of FIGURE 10a;

FIGURE 11 shows a partial cross section of the measuring device according to the invention in connection with another type of container;

FIGURE 12 shows a perspective view of the upper part of a container and measuring device in the form to be sold;

FIGURE 13 shows a part of a front view similar to FIGURE 1 of a modification of the dispensing device with a slide cover without a sprinkling position;

FIGURE 14 shows a view similar to FIGURE 13, but with the slide cover in the dispensing position;

FIGURE 15 shows a part of a front view similar to FIGURE 1 of a further modification of the dispensing device;

FIGURE 16 shows a view similar to FIGURE 15, but with the slide cover in the refilling position; while FIGURE 17 shows a top view of FIGURE 16, but including the front wall of the container.

Figure 1:
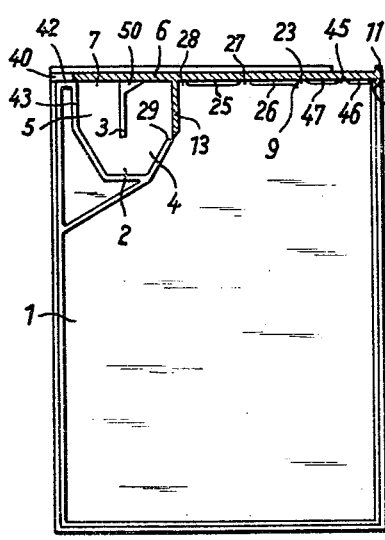
FIGURE 1 shows a front view of a dispensing device according to the invention in connection with a container, the front wall of which is removed and the closed slide cover of which is shown in cross section.
Figure 6:
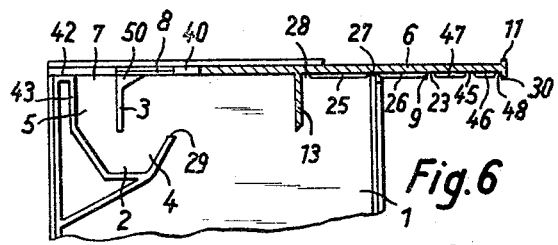
FIGURE 6 shows a similar view, but with the slide cover in the pouring position.

As illustrated in the drawings and more particularly in FIGURE 1, a preferred embodiment of the invention consists of a flat rectangular boxlike container which is open at its upper side and comprises a storage compartment 1 for a granular or pulverulent material which may consist, for example, of any one of different food items, spices, medicines, or materials for technical purposes, and of a measuring device in the form of a measuring compartmetnt 2 which is secured in one corner of the open side of the storage compartment 1. A partition 3 which is secured to the front and rear walls of compartment 1 divides the measuring compartment 2 into two communicating sections forming a receiving chamber 4 and a dispensing chamber 5. The outlet opening 7 of the dispensing chamber 5 may be closed by a silde cover 6 which is slidable by means of lateral guide edges 6a, as shown particularly in FIGURE 10b, in grooves 8 which are provided in the front and rear walls of the container and in this particular embodiment extend up to the partition 3, as indicated in FIGURE 6. In FIGURE 1, the slide cover 6 is shown in its closed position in which it covers the outlet opening 7 of the dispensing chamber 5.

Figure 5:
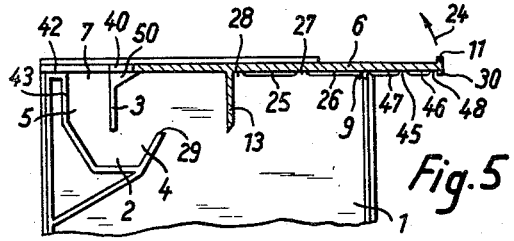
FIGURE 5 shows a view similar to FIGURE 4, but with the slide cover in the dispensing position for dispensing a measured amount of material.

On its inner side, slide cover 6 has a projection 9 which serves as a stop to limit the extent to which the cover may be opened by engaging on the inside of the right side wall of the storage compartment 1, as shown in FIGURE 5. When the slide cover 6 is in this open position, the outlet opening 7 of the dispensing chamber 5 is completely uncovered to permit the contents of the measuring compartment 2 to be removed. For opening the slide cover more easily, its right end is provided with an upwardly directed projection 11. In place of this projection the slide cover may also be provided at its outer side with a recess 11a as shown in FIGURE 17, for the insertion of a fingertip. The direction in which the slide cover is to be opened is indicated thereon by an arrow 12. The inner side of cover 6 is further provided with a closure member 13 which, when the cover is fully closed, as shown in FIGURE 1, closes the receiving chamber 4 toward the storage compartment 1. When the cover is in the dispensing position, as shown in FIGURE 5, that is, when the stop projection 9 engages on the right side wall of the compartment 1 and the outlet opening 7 of the dispensing chamber 5 of the measuring compartment 2 is uncovered and when the closure member 13 is also shifted toward the right, the receiving chamber 4 communicates with the storage compartment 1. For preventing the slide cover 6 from being moved beyond its normal closing position, it is provided on its right end with a downwardly directed stop projection 30 which in the closed position of the slide cover engages on the right side wall of the container.

The stop projection 9 has the shape of a saw tooth with an inclined back tapering in the direction toward the closure member 13, that is, toward the measuring compartment 2, and a stop surface which extends substantially at a right angle to the inner surface of the cover and abuts against the right side wall of the container when the cover is shifted to the dispensing position.

Figure 9:
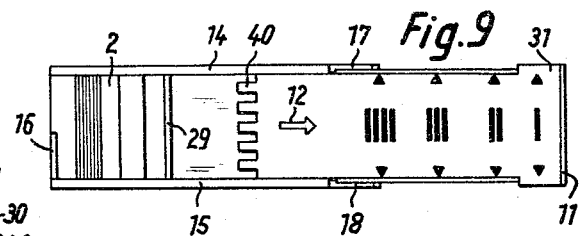
FIGURE 9 shows a top view of FIGURE 8, but including the front wall of the container.

As shown particularly in FIGURE 9, the container is made of two parts, the main part 14 of which comprises the walls of the storage compartment 1 and of the receiving chamber 4 and the dispensing chamber 5 including the partition 3, but it does not include the front wall of the container. This front wall is connected to another part 15 which may be fitted on the main part 14 by means of guide portions 16 in a manner similar to a box cover. Parts 14 and 15 may be secured to each other by an adhesive or by a strip of adhesive tape.

Figure 7:
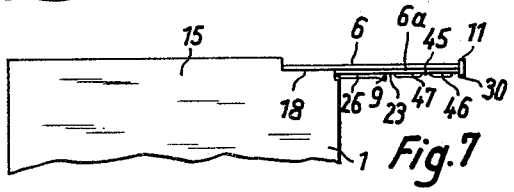
FIGURE 7 shows a partial front view of the container with the front wall thereon and with the slide cover in the position according to FIGURE 6.
Figure 8:
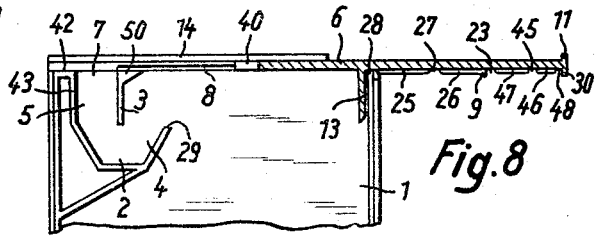
FIGURE 8 shows a view similar to FIGURES 4 to 6, but with the slide cover in the outermost position.

The upper ends of the front and rear walls of the container containing the guide grooves 8 for the slide cover are provided with recesses 17 and 18. As indicated in FIGURES 7 and 9, these recesses extend from the right side wall of the container and have a length approximately equal to the distance of movement of the stop projection 9 from the closed position of the cover to its dispensing position. Thus, within the area of these recesses 17 and 18, the slide cover is not held by any guiding means. Slide cover 6 is made of a resilient material so as to act like a leaf spring. When the cover is drawn outwardly to the dispensing position, as shown in FIGURE 5, its free end up to the inner ends of recesses 17 and 18 may be lifted against its spring action in the direction of the arrow 24 until the stop projection 9 is lifted over the upper edge of the right container wall, so that the slide cover 6 may then be pulled out beyond the dispensing position until its further movement is stopped, as shown in FIGURE 8, by the engagement of the closing member 13 against the right container wall.

For dispensing a measured quantity of the material from the container, the slide cover 6 is shifted from its closed position, as shown in FIGURE 1, toward the right until the stop projection 9 engages with the right side wall, as shown in FIGURE 5. The slide cover 6 is then in its dispensing position in which it is withdrawn completely from the outlet opening 7 of the dispensing chamber 5 and in which by the withdrawal of the closing member 3 it also opens the receiving chamber 4 toward the storage compartment 1. If the container is then tilted over, the amount of material contained in the measuring compartment 2 will be poured out through the outlet opening 7 and at the same time the space between the partition 3 and the closure member 13 will be filled with new material from the storage compartment 1. When the container is then tilted back to its vertical position, a fixed and always identical quantity of the material is filled into the receiving chamber 4. If the slide cover 6 is then pushed back to its closed position, it shuts the outlet opening 7 of the dispensing chamber 5 and by means of the closure member 13 it also closes the receiving chamber 4 toward the storage compartment 1. The container may then be moved around in any manner without danger that any of the material contained in the measuring compartment 2 might fall back into the storage compartment 1 or that any additional amount of material might pass into the measuring compartment 2.

Figure 2:
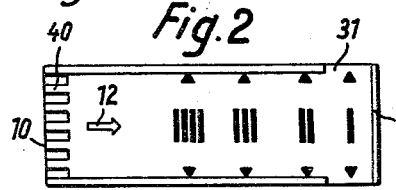
FIGURE 2 shows a top view of FIGURE 1.
Figure 3:
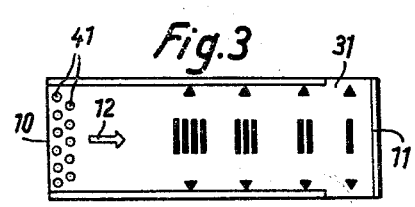
FIGURE 3 shows a top view similar to FIGURE 2 in which, however, the slide cover is provided with sprinkling openings of a different shape.

On or adjacent to its left edge 10, the slide cover 6 is provided with a series of narrow apertures or recesses which in the embodiment according to FIGURES 1 and 2 are formed by serrations or slots 40 in this edge 10, while in the modification according to FIGURE 3 they are formed by a series of small holes 41 in the part of the cover directly adjacent to the edge 10. By spacing the outer wall 43 of the measuring compartment 2 at a suitable distance from the left side wall of the container, the upper surface 42 of the connecting part between these two walls which the slide cover 6 overlaps in the closed position (FIGURE 1) has such a width that in this position of the slide cover the slots 40 or holes 41 in or near the left edge of the cover will be closed toward the inside and the outlet opening 7 of the measuring compartment 2 will therefore be fully closed by the slide cover.

Near its right end the slide cover 6 is provided on its lower side with a locating recess 45 which is formed by the space between two reinforcements 46 and 47 on the slide cover. The reinforcement 46 is spaced from the stop projection 30 on the right end of the slide cover so as to form another locating recess 48 into which the upper edge of the right side wall of the container engages when the slide cover is in the closed position so as to hold the cover in this position.

Figure 4:
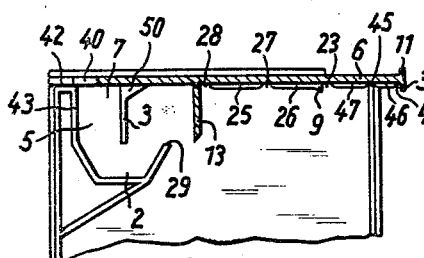
FIGURE 4 shows a part of a front view similar to FIGURE 1, but with the slide cover in the sprinkling position.

If the right end of the resilient slide cover is lifted slightly upwardly for a distance equal to the thickness of the reinforcement 46, the cover may be drawn out so as to open it. The reinforcement 46 then slides over the upper edge of the right side wall of the container until this edge engages into the locating recess 45. As shown in FIGURE 4, this recess 45 is located in such a position that when the slide cover is pulled out this far, it still covers the outlet opening 7 of the dispensing chamber 5 completely, except that the slots 40 or holes 41 will now be located over this opening. These slots or holes then serve as sprinkling openings through which, when the container is tilted and shaken, small quantities of the contents of the container may be sprinkled in the same manner as from a salt shaker. The slots 40 or holes 41 may be made of a size in accordance with the nature of the contents of the container. Since in the sprinkling position of the slide cover 6 the closure member 13 is already shifted away from the receiving chamber 4 of the measuring compartment 2 and the latter is therefore open toward the storage compartment 1, the amount of material which is sprinkled out of the measuring compartment 2 is immediately replaced therein from the storage compartment 1 by the shaking of the tilted container. The sprinkling may therefore be continued indefinitely as long as there is any material left in the container.

If the slide cover 6 is to be opened to the position as shown in FIGURE 5 for the purpose of dispensing a predetermined quantity of material in accordance with the capacity of the measuring compartment 2, the slide cover is again lifted slightly upwardly at its right end so as to unhook it from the upper edge of the right side wall of the container and to permit it to be further drawn toward the right until its stop projection 9 abuts against this side wall. The reinforcement 47 which during this movement slides along the upper edge of the right side wall is spaced from the stop projection 9 so as to form another locating recess 23 into which this upper edge will then engage so that the slide cover will then be locked in both directions and prevented from being shifted accidentally.

In order to prevent any unchecked amounts of material from passing through the sprinkling openings 40 or 41 when the slide cover is in the dispensing position and the contents of the measuring compartment 2 are being poured out, the upper end 50 of the partition 3 is laterally enlarged to such an extent in the direction toward the closure member 13 that the openings 40 or 41 are fully covered by this enlargement.

In the particular embodiment of the invention as above described, the stop projection 9 projects downwardly from one end of a further reinforcement 26 on the slide cover 6, the other end of which is spaced from still another reinforcement 25 so as to form another locating recess 27. If the free end of the slide cover is lifted so that the stop projection 9 can pass over the upper edge of the right side wall of the container, the cover may be further pulled out to the position as shown in FIGURE 6, in which it will be arrested by the engagement of the same upper edge into the locating recess 27. Since in this position, the cover is so far withdrawn that its front edge 10 is then located approximately above the edge 29 of the measuring compartment 2, the contents of the storage compartment 1 may be freely poured out through the enlarged outlet opening 7.

Between the cover reinforcement 25 and the adjacent closure member 13 there is still another locating recess 28 provided into which the upper edge of the right side wall of the container engages when the slide cover is moved to its outermost position.

While in the embodiment of the invention as illustrated, only the stop projection 9 for the dispensing position which is most frequently used, namely, for dispensing measured amounts of the material, projects slightly beyond the lower surfaces of the cover reinforcements 25, 26, 46, and 47, similar stop projections may also be provided on the right ends of the reinforcements 25 and 47 so as also to prevent the slide cover when being pulled out from passing over the sprinkling position according to FIGURE 4 and the free pouring position according to FIGURE 6, but to require for any movement of the slide cover also from these positions that it again be lifted at its free end. The left ends of the cover reinforcements 25, 26, 46, and 47 are shaped so as to allow them to pass freely over the edge of the right side wall of the container when the cover is moved toward the closed position. Therefore, when the cover is lifted slightly at its end against its spring action, it may be moved in one draw from its outermost position according to FIGURE 8 to its fully closed position according to FIGURE 1.

As shown in FIGURES 9 and 10b, each of the four operating positions, i.e. the sprinkling position, the measured-quantity dispensing position, the pouring position, and the outermost position, are indicated on the outer side of the slide cover at points coinciding with the positions of the locating recesses 45, 23, 27, and 28 by the marks I, II, III, and IV, respectively.

When the slide cover is in the outermost position according to FIGURE 8, in which the closure member 13 abuts against the right side wall of the container, the cover may be lifted entirely out of the container so that the largest possible opening will then be attained, for example, for filling the container. For this purpose, the lateral guide edges 6a on the slide cover are spaced from the left end 10 thereof at a distance 1, as shown in FIGURE 10, so that when the slide cover is drawn out to its outermost position, these guide edges 6a will pass out of the grooves 8 in the container walls when they have reached the recesses 17 and 18. For reinserting the slide cover into the container, the mentioned procedure is followed in the reverse order. The right end portion 31 of slide cover 6 which is located between the recesses 17 and 18 when the cover is in the closed position is enlarged so as to have a width equal to the outer width of the container so that when the cotnainer is closed, the recesses 17 and 18 are filled out.

In FIGURE 10, the guide edges 6a are provided with thin extensions 6b which are designed so as to engage resiliently into the grooves 8 in the container wall and to give the slide cover a certain support on the container walls when it is drawn out to its outermost position so that the cover will not drop off due to its own gravity.

The container according to the invention is preferably made of antistatic material so as to prevent even a very fine powdery material of a low specific gravity from adhering to its walls due to an electrostatic charge.

The measuring device according to the invention may also be made as a product separate from the container and be applied as a top to any other container of a suitable size. In this case, the device is also composed of two parts as previously described, but has a low height and its outer wall part is open at its lower side. As illustrated in FIGURE 11, this wall part which has a shoulder 32 is inserted into the respective container 33 until this shoulder engages with the upper edge of the container. This wall part may then be either glued directly to the walls of the container 33 or be connected thereto by an adhesive tape 34 which is applied upon the outside. Underneath the connection to the measuring device, the container 33 may also have a bottlelike enlargement.

For the sale of a filled cotnainer which is provided with and closed by the measuring device according to the invention, the entire container is preferably enclosed by a covering of cellophane or the like which prevents any access to the slide cover. If the cotnainer is to be sold without such a covering, the slide cover may be locked in its closed position by a cap 35 of paper, cellophane, or the like which covers the outer end of the slide cover and the adjacent parts of the container and is glued to the container walls, and which may be torn off above the slide cover when the container is first to be used.

FIGURES 13 and 14 show a modification of the measuring device according to the invention, in which the sprinkling position is omitted and which therefore only has a position for dispensing measured amounts, a pouring position, and an outermost position. The slide cover 6 may be drawn out to the dispensing position without any intermediate stop. In place of the two cover reinforcements 46 and 47 in front of the stop projection 9 as previously described, there is only a single cover reinforcement 19 which together with the stop projection 9 forms a locating recess 23 for holding the slide cover in the dispensing position, and which together with the outer stop projection 30 forms another locating recess for holding the cover in the closed position. For easily opening the slide cover 6, it is provided on its upper side with a recess 11a for inserting the tip of a finger. The locating recesses 27 and 28 for holding the slide cover in the pouring position and in the outermost position are formed in the manner as already described by two cover reinforcements 25 and 26 which are provided on the inner side of the slide cover between the closure member 13 and the stop projection 9 which determines the dispensing position and is provided on the reinforcement 26.

FIGURES 15 to 17 show a further modification of the invention, in which all locating recesses on the inner side of the slide cover 6 are omitted so that this side is only provided with the closure member 13 and the stop projection 9 for determining the dispensing position. The closing position of the slide cover 6 is here determined by the engagement of its left edge 10 with the upper end of the left side wall of the container. The downwardly directed stop projection 30 on the free end of the slide cover as provided in the embodiments which have been previously described is therefore omitted.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A dispensing device for dispensing measured amounts of a free-flowing solid material from a container, comprising, in combination, a container part having opposite side walls, front and rear walls, and an open upper side adapted to form at least a part of a storage chamber, guiding means on said front and rear walls of said container part, a slide cover slidable within and guided by said guiding means for closing and at least partly opening said upper side, a stop member and a closure member on and projecting downwardly from the inner side of said cover, a measuring compartment connected to and within said container part near one side wall thereof underneath said cover, a partition within said container part partly dividing said measuring compartment into a receiving chamber and an adjacent dispensing chamber, said chambers communicating underneath said partition with each other, said dispensing chamber having an upper outlet opening and said receiving chamber having an upper opening leading to said storage compartment, said cover adapted when in one position to close said open side and said outlet opening completely and when drawn out to a dispensing position defined by the engagement of said stop member with the upper edge of the other side of said container part to uncover said outlet opening to allow dispensing therethrough only from said dispensing compartment, said closure member adapted to close said opening of said receiving chamber when said cover is closed to shut off said receiving chamber from said storage compartment and adapted to uncover said last opening when said cover is in said dispensing position, said guiding means being offset from an area adjacent to the position in which said stop member is located when said cover is in said dispensing position, said cover consisting of a resilient material permitting its unguided outer end in the dispensing position to be lifted against its spring action for a distance at least equal to the height of said stop member so as to disengage said stop member from the upper edge of said other side wall so that said cover may then be drawn out beyond said dispensing position, a first projection on the inner side of said slide cover, said stop member forming one end of said first projection, a second projection on the inner side of said cover having one end spaced slightly from the other end of said first projection so as to form an intermediate locating recess into which the upper edge of said otherside wall is adapted to engage when said cover is drawn out beyond said dispensing position to a pouring position in which it completely uncovers said entire measuring compartment so that an unmeasured amount of material may be poured out from said storage chamber, the other end of said second projection being spaced slightly from said closure member so as to form another locating recess into which said upper edge of said other side is adapted to engage when said cover is further drawn out for holding said cover in its outermost position, said intermediate locating recess for holding said slide cover in said pouring position being located in a position in which the closing edge of said cover is located approximately above the inner edge of the opening of said receiving chamber leading to said storage compartment.

2. A dispensing device for dispensing measured amounts of a free-flowing solid material from a container, comprising, in combination, a container part having opposite side walls, front and rear walls, and an open upper side adapted to form at least a part of a storage chamber, guiding means on said front and rear walls of said container part, a slide cover slidable within and guided by said guiding means for closing and at least partly opening said upper side, a stop member and a closure member on and projecting downwardly from the inner side of said cover, a measuring compartment connected to and within said container part near one side wall thereof underneath said cover, a partition within said container part partly dividing said measuring compartment into a receiving chamber and an adjacent dispensing chamber, said chambers communicating underneath said partition with each other, said dispensing chamber having an upper outlet opening and said receiving chamber having an upper opening leading to said storage compartment, said cover adapted when in one position to close said open side and said outlet opening completely and when drawn out to a dispensing position defined by the engagement of said stop member with the upper edge of the other side of said container part to uncover said outlet opening to allow dispensing therethrough only from said dispensing compartment, said closure member adapted to close said opening of said receiving chamber when said cover is closed to shut off said receiving chamber from said storage compartment and adapted to uncover said last opening when said cover is in said dispensing position, said guiding means being offset from an area adjacent to the position in which said stop member is located when said cover is in said dispensing position, said cover consisting of a resilient material permitting its unguided outer end in the dispensing position to be lifted against its spring action for a distance at least equal to the height of said stop member so as to disengage said stop member from the upper edge of said other side wall so that said cover may then be drawn out beyond said dispensing position, a first projection on the inner side of said slide cover, said stop member forming one end of said first projection, a second projection on the inner side of said cover having one end spaced slightly from the other end of said first projection so as to form an intermediate locating recess into which the upper edge of said other side wall is adapted to engage when said cover is drawn out beyond said dispensing position to a pouring position in which it completely uncovers said entire measuring compartment so that an unmeasured amount of material may be poured out from said storage chamber, the other end of said second projection being spaced slightly from said closure member so as to form another locating recess into which said upper edge of said other side is adapted to engage when said cover is further drawn out for holding said cover in its outermost position, the lower surfaces of said projections being spaced at substantially equal distances from the inner surface of said cover, said stop member being integral with and projecting downwardly from the lower surface of said first projection, the front edge of said stop member forming a straight extension of one end of said first projection, said projections being adapted to slide over said upper edge of said other side wall when said cover is moved from its outermost position and from its pouring position in the direction toward its closing position.

3. A dispensing device for dispensing measured amounts of a free-flowing solid material from a container, comprising in combination a container part having opposite side walls, front and rear walls, and an open upper side adapted to form at least a part of a storage chamber, guiding means on said front and rear walls of said container part, a slide cover slidable within and guided by said guiding means for closing and at least partly opening said upper side, a stop member and a closure member on and projecting downwardly from the inner side of said cover, a measuring compartment connected to and within said container part near one side wall thereof underneath said cover, a partition within said container part partly dividing said measuring compartment into a receiving chamber and an adjacent dispensing chamber, said chambers communicating underneath said partition with each other, said dispensing chamber having an upper outlet opening and said receiving chamber having an upper opening leading to said storage compartment, said cover adapted when in one position to close said open side and said outlet opening completely and when drawn out to a dispensing position defined by the engagement of said stop member with the upper edge of the other side of said container part to uncover said outlet opening to allow dispensing therethrough only from said dispensing compartment, said closure member adapted to close said opening of said receiving chamber when said cover is closed to shut off said receiving chamber from said storage compartment and adapted to uncover said last opening when said cover is in said dispensing position, said guiding means being offset from an area adjacent to the position in which said stop member is located when said cover is in said dispensing position, said cover consisting of a resilient material permitting its unguided outer end in the dispensing position to be lifted against its spring action for a distance at least equal to the height of said stop member so as to disengage said stop member from the upper edge of said other side wall so that said cover may then be drawn out beyond said dispensing position, the upper edge of said first side wall of said container part having a lateral enlargement projecting toward the inside of said container part, said slide cover having a plurality of sprinkling openings directly adjacent to its closing edge, said openings overlying and thus being covered by said enlargement when said cover is in the closed position, and communicating with said outlet opening when said cover is slightly drawn out to a sprinkling position in which the closing edge of said cover still covers said outlet opening, said cover having a locating recess on its inner side intermediate its outer end and said stop member, the upper edge of said other side wall being adapted to engage into said locating recess to hold said cover in said sprinkling position.

4. A dispensing device as defined in claim 3, in which said locating recess for said sprinkling position is formed between the adjacent edges of two projections on the inner side of said cover, the first of said two projections being slightly spaced from said stop members so as to form another locating recess for holding said cover in said dispensing position and a further projection near the outer end of said cover an slightly spaced from the second of said two projections so as to form a further locating recess for holding said cover in its closed position.

5. A dispensing device as defined in claim 3, in which said sprinkling openings are formed by serrations in the closing edge of said cover.

6. A dispensing device as defined in claim 3, in which said sprinkling openings are formed by a plurality of small holes in said cover closely adjacent to the closing edge thereof.

7. A dispensing device as defined in claim 3, in which said partition has an upper end surface adapted substantially to engage with the inner side of said slide cover and being enlarged to such a width that, when said cover is in the dispensing position, said sprinkling openings overlie and are thus covered by said enlarged end surface.

8. A dispensing device for dispensing measured amounts of a free-flowing solid material from a container, comprising, in combination, a container part having opposite side walls, front and rear walls, and an open upper side adapted to form at least a part of a storage chamber, guiding means on said front and rear walls of said container part, a slide cover slidable within and guided by said guiding means for closing and at least partly opening said upper side, a stop member and a closure member on and projecting downwardly from the inner side of said cover, a measuring compartment connected to and within said container part near one side wall thereof underneath said cover, a partition within said container part partly dividing said measuring compartment into a receiving chamber and an adjacent dispensing chamber, said chambers communicating underneath said partition with each other, said dispensing chamber having an upper outlet opening and said receiving chamber having an upper opening leading to said storage compartment, said cover adapted when in one position to close said open side and said outlet opening completely and when drawn out to a dispensing position defined by the engagement of said stop member with the upper edge of the other side of said container part to uncover said outlet opening to allow dispensing therethrough only from said dispensing compartment, said closure member adapted to close said opening of said receiving chamber when said cover is closed to shut off said receiving chamber from said storage compartment and adapted to uncover said last opening when said cover is in said dispensing position, said guiding means being offset from an area adjacent to the position in which said stop member is located when said cover is in said dispensing position, said cover consisting of a resilient material permitting its unguided outer end in the dispensing position to be lifted against its spring action for a distance at least equal to the height of said stop member so as to disengage said stop member from the upper edge of said other side wall so that said cover may then be drawn out beyond said dispensing position, said guiding means for said slide cover being grooved and provided on said front and rear walls of said container part and spaced for a certain distance from said other side wall, said slide cover having guide edges adapted to engage in and to slide along said grooved guiding means, said guide edges being offset for a certain distance from the closing edge of said cover, said distances being of such a length that, when said cover is drawn out to its outermost position in which said closure member thereon engages with said other side wall, said cover is disengaged from said guiding means on said container part and may be removed from said container part.

9. A dispensing device as defined in claim 8, further comprising resilient extensions on the ends of said guide edges directed toward and spaced from said closing edge of said cover and adapted to remain in said grooved guiding means when said cover is drawn out to its outermost position so as to prevent said cover from falling off by its own gravity.

References Cited by the Examiner
UNITED STATES PATENTS

| | | | |
|---|---|---|---|
| 559,794 | 5/96 | Fish | 222—44 |
| 1,913,767 | 6/33 | Mills | 222—49 X |
| 2,233,602 | 3/41 | Greeley. | |
| 2,346,847 | 4/44 | Larson | 222—561 X |
| 2,867,359 | 1/59 | Adams | 222—561 X |
| 3,016,170 | 1/62 | Merkel | 222—425 |

RAPHAEL M. LUPO, *Primary Examiner.*

LOUIS J. DEMBO, *Examiner.*